(12) United States Patent
Drehobl et al.

(10) Patent No.: US 12,286,946 B2
(45) Date of Patent: Apr. 29, 2025

(54) GAS MIXER

(71) Applicant: Caterpillar Energy Solutions GmbH, Mannheim (DE)

(72) Inventors: Enrico Drehobl, Reilingen (DE); Thomas Wilstermann, Ladenburg (DE); Ute Goerdes, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 0 days.

(21) Appl. No.: 18/288,320

(22) PCT Filed: May 16, 2022

(86) PCT No.: PCT/EP2022/025228
§ 371 (c)(1),
(2) Date: Oct. 25, 2023

(87) PCT Pub. No.: WO2022/242911
PCT Pub. Date: Nov. 24, 2022

(65) Prior Publication Data
US 2024/0209815 A1      Jun. 27, 2024

(30) Foreign Application Priority Data
May 20, 2021   (GB) .................................... 2107223

(51) Int. Cl.
*F02M 23/00*      (2006.01)
*F02M 21/02*      (2006.01)
*F02M 21/04*      (2006.01)

(52) U.S. Cl.
CPC ...... *F02M 23/003* (2013.01); *F02M 21/0296* (2013.01); *F02M 21/042* (2013.01); *F02M 2700/126* (2013.01)

(58) Field of Classification Search
CPC ............. F02M 23/003; F02M 21/0296; F02M 21/042; F02M 2700/126
See application file for complete search history.

(56) References Cited

U.S. PATENT DOCUMENTS 5,908,475 A * 6/1999 Morris, Jr. ........... F02M 21/042
                                                            48/189.3
6,865,889 B2 * 3/2005 Mancini .................... F23R 3/16
                                                            60/737

(Continued)

FOREIGN PATENT DOCUMENTS

| CN | 104590268 A | 5/2015 |
| CN | 107228028 A | 10/2017 |

(Continued)

OTHER PUBLICATIONS

International Search Report related to Application No. PCT/EP2022/025228; reported on Sep. 22, 2022.

(Continued)

*Primary Examiner* — Sizo B Vilakazi (57) ABSTRACT

The present invention pertains to a gas mixer for an internal combustion engine for mixing air with at least one admix gas, comprising a first duct segment having a first tube section and a first cone section, and a second duct segment having a second tube section and a second cone section. The first and second duct segments are stackable such that in a stacked state, a main gas conduit is formed by the first and second tube sections and an admix gas conduit is formed between the first cone section and the second duct segment. The present disclosure also pertains to a method for producing a gas mixer, comprising the steps of: for a predetermined mass flow of a gas to be admixed to air, calculating a flow cross section; machining at least one inner surface of an admix gas conduit such that at any position, the admix gas conduit comprises at least the calculated flow cross section;

(Continued)

stacking two duct segments to provide the gas mixer. The present disclosure also pertains to a duct segment for being used in the gas mixer.

15 Claims, 6 Drawing Sheets

(56) References Cited

U.S. PATENT DOCUMENTS

| | | | | |
|---|---|---|---|---|
| 7,204,241 | B2* | 4/2007 | Thompson | F01M 13/021 |
| | | | | 123/573 |
| 8,800,146 | B2* | 8/2014 | Mao | F23R 3/28 |
| | | | | 29/889.22 |
| 9,611,810 | B2* | 4/2017 | Schwark | F02M 26/19 |
| 9,863,371 | B2 | 1/2018 | El Gammal et al. | |
| 9,863,771 | B2* | 1/2018 | Ciminelli | G01C 19/727 |
| 10,415,832 | B2* | 9/2019 | Lee | F23R 3/14 |
| 11,193,455 | B2* | 12/2021 | Jin | F02M 26/17 |
| 2010/0300407 | A1* | 12/2010 | Ravenhill | F02M 35/10144 |
| | | | | 123/468 |
| 2019/0203680 | A1* | 7/2019 | Patil | B01F 23/10 |

FOREIGN PATENT DOCUMENTS

| | | |
|---|---|---|
| CN | 108674410 A | 10/2018 |
| CN | 209067379 U | 7/2019 |
| GB | 2356223 A | 5/2001 |
| KR | 101995173 B1 | 7/2019 |
| WO | 2018022092 A1 | 2/2018 |

OTHER PUBLICATIONS

Great Britain Search Report related to Application No. 2107223.6; reported on Oct. 27, 2021.

* cited by examiner

GAS MIXER

CROSS-REFERENCE TO RELATED APPLICATION

This Application is a 35 USC § 371 US National Stage filing of International Application No. PCT/EP2022/025228 filed on May 16, 2022 which claims priority under the Paris Convention to Great Britain Patent Application No. 2107223.6 filed on May 20, 2021.

TECHNICAL FIELD

The present disclosure relates to a gas mixer for an internal combustion engine for mixing air with at least one admix gas, and particularly relates to a mixer for preparing uniform mixture of air and gases for combustion in a gaseous engine. The present disclosure also relates to a method for producing such a gas mixer. The present disclosure also relates to a duct segment to be used in such a gas mixer.

Technological Background

In internal combustion engines (ICEs), especially ICEs with gaseous fuel, a mixing device is needed in order to create a homogeneous mixture of air and gaseous fuel.

Gaseous fuel candidates range from natural gas over intermediate hydrocarbon gases to pure hydrogen. In this context, gas mixing devices are used to mix a combustible gas composition consisting of air and one or more fuel gases. Usually, the gas mixing device is positioned upstream of the compressor inlet of a turbocharger.

Additionally, in the mixing device, gases from a compressor bypass and/or a crankcase ventilation system can also be admixed to the air. With increasing numbers of gases to be mixed with air, the complexity of the gas mixer geometry and therefore the need of parts is strongly increasing. Usually, with gases to be admixed to air, the costs for producing, installing and maintaining the gas mixer increase overproportionately.

SUMMARY OF THE INVENTION

Starting from the prior art, it is an objective to provide a simple, cost-effective and reliable gas mixer for an internal combustion engine for mixing air with at least one admix gas.

This objective is solved by means of a gas mixer for an internal combustion engine for mixing air with at least one admix gas with the features of claim 1 and a method for manufacturing the gas mixer according to claim 11. Preferred embodiments are set forth in the present specification, the figures as well as the dependent claims.

Accordingly, a gas mixer for an internal combustion engine for mixing air with at least one admix gas is provided. The gas mixer comprises a first duct segment having a first tube section and a first cone section, and a second duct segment having a second tube section and a second cone section. The first and second duct segments are stackable such that in a stacked state, a main gas conduit is formed by the first and second tube sections and an admix gas conduit is formed between the first cone section and the second duct segment.

Furthermore, a method for producing such a gas mixer is provided comprising the steps of for a predetermined mass flow of a gas to be admixed to air, calculating a flow cross section, machining at least one inner surface of an admix gas conduit consisting of two adjacent gas conduit segments such that at any position, the admix gas conduit comprises at least the calculated flow cross section, and stacking the two duct segments to provide the gas mixer.

Furthermore, a duct segment for being used in a gas mixer for an internal combustion engine for mixing air with at least one admix gas is provided. The duct segment comprises a tube section and a cone section.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying figures. In the Figures, like elements are denoted by identical reference numerals and repeated description thereof may be omitted in order to avoid redundancies.

The present disclosure is generally directed towards a gas mixer for an internal combustion engine for mixing air with at least one admix gas. According to embodiments of the present disclosure, the gas mixer provides a simple, cost-effective and reliable gas mixer which is usually installed upstream of a turbocharger of internal combustion engine such as a gas engine. In principle, the gas mixer of the present disclosure represents a gas supply device operated at a slight overpressure, which allows at least one admix gas to be admixed to air or another gas composition via an individual admix gas conduit. To this end, the gas mixer of the present disclosure is relatively simple, modular and allows mixing air and the at least one admix gas to a homogeneous mixture with relatively minimal efforts for marginal costs.

Thereto, the present invention and its underlying principles are explained exemplary for a gas mixer for an internal combustion engine.

Figure 1:
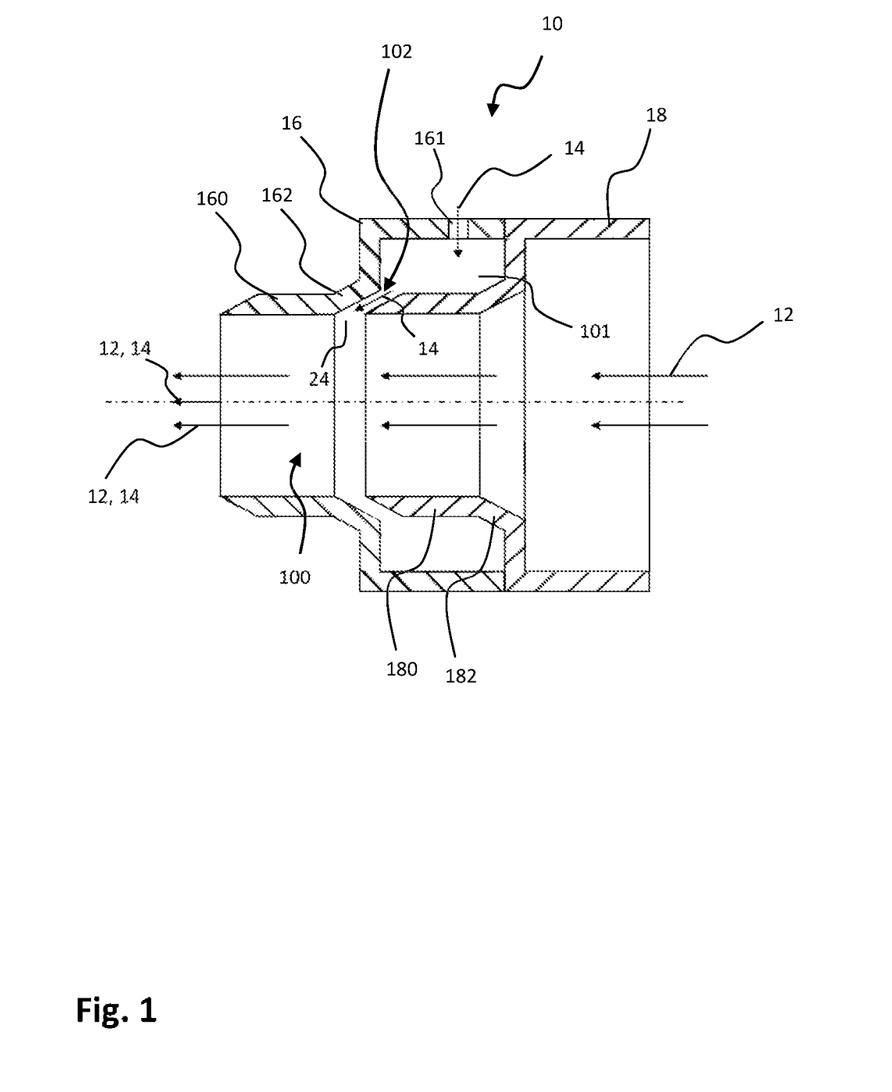
FIG. 1 schematically shows a gas mixer for an internal combustion engine, according to an embodiment.

FIG. 1 schematically illustrates a gas mixer 10 for an internal combustion engine for mixing air 12 with at least one admix gas 14. The gas mixer 10 may comprise a first duct segment 16 having a first tube section 160 and a first cone section 162 as well as a second duct segment 18 having a second tube section 180 and a second cone section 182. The first and second duct segments 16, 18 may be axially stackable such that in a stacked state, a main gas conduit 100 is formed by the first and second tube sections 160, 180, while an admix gas conduit 102 is formed between the first cone section 162 and the second duct segment 18. The first duct segment 16 and/or the second duct segment 18 may be a casting.

According to the present disclosure, the term admix gas refers to a gas to be admixed to air 12 or any gas composition present within the main gas conduit 100 via the admix gas conduit 102.

In general, a tube section may have a diameter smaller than a cone section. The tube section may have constant diameter. The cone section may begin at an end of the tube section and may protrude radially outwards from an axis of the tube section. According to the present disclosure, the cone section itself may incorporate the actual cone and a further tubular part having a constant diameter. Alternatively, the cone section may also comprise any other geometry which provides, in combination with the further duct segment stacked onto it, an admix gas conduit.

The term "air" refers to the gas composition present in the main gas conduit 100. As a matter of course, only if no further gas had been injected upstream of a given location, said gas composition consist of air only. In most cases, the term "air" represents air admixed with one or more further admix gases or other gas components present in the main gas conduit 100.

In the following, the terms "first" and "second" are used to distinguish between duct segment 1 and duct segment 2. Unless stated otherwise, said terms are not meant such that each duct segment has first and second components.

In FIG. 1, the first and second duct segments 16, 18 are disclosed and discussed in a stacked condition. With reference to the individual duct segment 16, it is also referred to the illustration and explanations provided in the context of FIG. 5.

According to FIG. 1, the admix gas conduit 102 may be formed between the first cone section 162 (a first end of the tube section 160 of the first duct segment 16) and the second tube section 180 (a second end of the tube section 180 of the second duct segment 18).

In particular, the second end of the second tube section 180 may comprise a tapered end in the shape of a nozzle such that the admix gas conduit 102 leads into the main gas conduit at an angle of 10°-45°, for example 30°. Ideally, the nozzle may be configured such that it follows the form and/or inclination of the adjacent cone section 162. Thereby, an admix gas conduit 102 having a constant cross-section along the length of the cone section 162 may be achieved, i.e. a constant annular gap between the first end of the first cone section and a second end of the second tube section. Further, an angle of about 10°-45°, for example 30°, allows admixing the admix gas 14 to the air 12 at a vector providing smooth yet efficient mixing of the gases.

The main gas conduit 100 may be configured such as to convey air 12 and the admix gas conduit 102 is configured such as to convey an admix gas 14 to be admixed to the air 12, wherein in a stacked state, the admix gas conduit 102 may be fluidly connected to the main gas conduit 100 by an annular gap 24. Thereby, a large overall cross-section of the admix gas conduit 102 outlet leading into the main gas conduit 100 may be achieved. Thereby, the admix gas 14 may be injected into the air 12 at low velocity for a given mass flow, which reduces noise, vibrations and unwanted pressure losses during the operation of the gas mixer 10.

In a stacked state, the admix gas conduit 102 may comprise a stepped portion forming a gas chamber 101. Further, the first duct segment 16 may comprise a gas inlet port 161 to provide an admix gas 14 supply to the admix gas conduit 102. The admix gas conduit 102 may be suitable for conveying a gas comprising natural gas, biogas, hydrogen, crankcase ventilation gas, exhaust gas recirculation gas or a compressor bypass gas. Beside the gas inlet port 161, which may be only provided in the first duct segment 16, the first and second duct segments 16 and 18 may be substantially identical.

Figure 2:
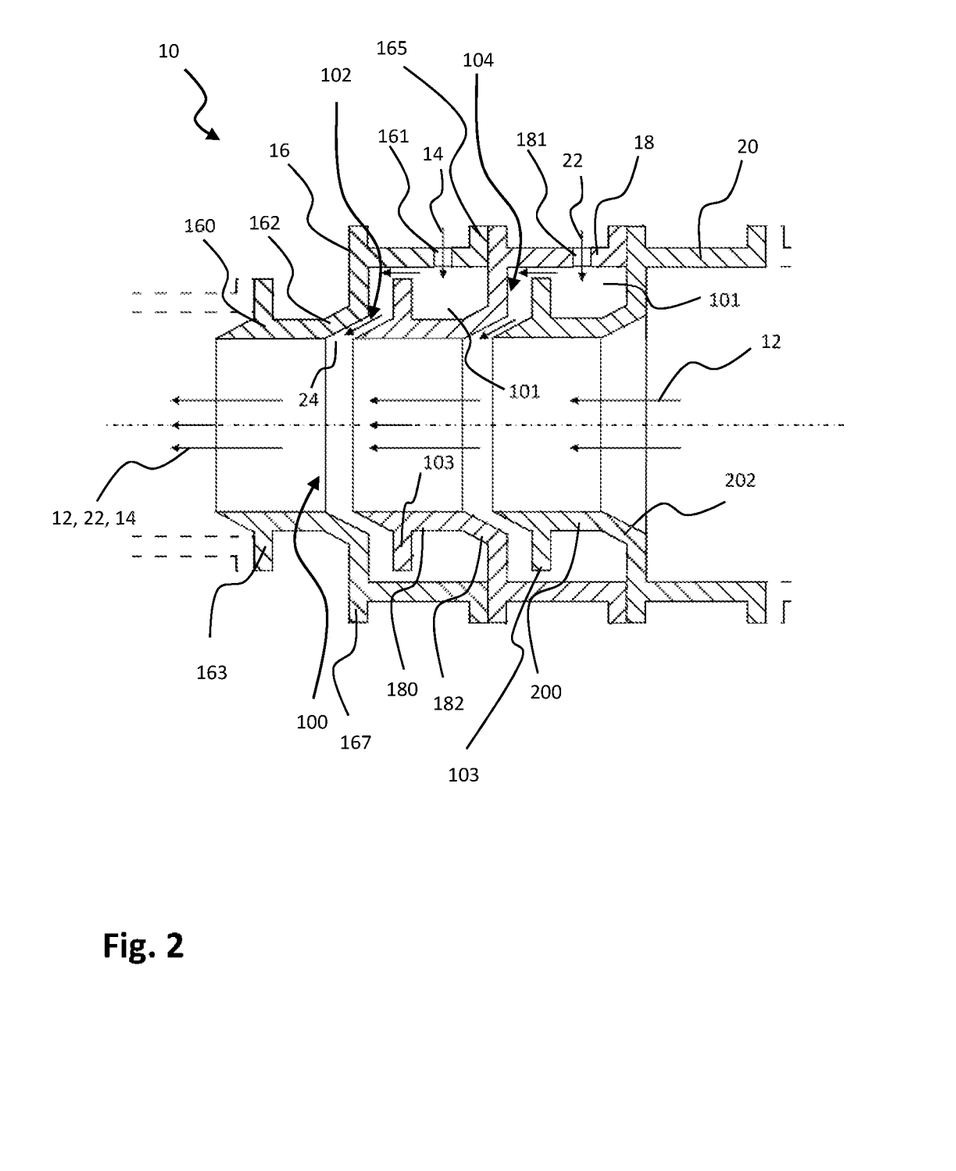
FIG. 2 schematically shows a gas mixer for an internal combustion engine, according to another embodiment.

In FIG. 2, a gas mixer 10 according to another embodiment is shown for an internal combustion engine for mixing air 12 with a gas 14 and a further gas 16. The embodiment shown in FIG. 2 may basically consist of slightly modified first and second duct segments 16, 18 shown in FIG. 1 along with an additional further duct segment 20 stacked onto the second duct segment 18. Hence, where applicable, the reference numbers of FIG. 1 are also incorporated in the embodiment disclosed in FIG. 2.

Figure 6:
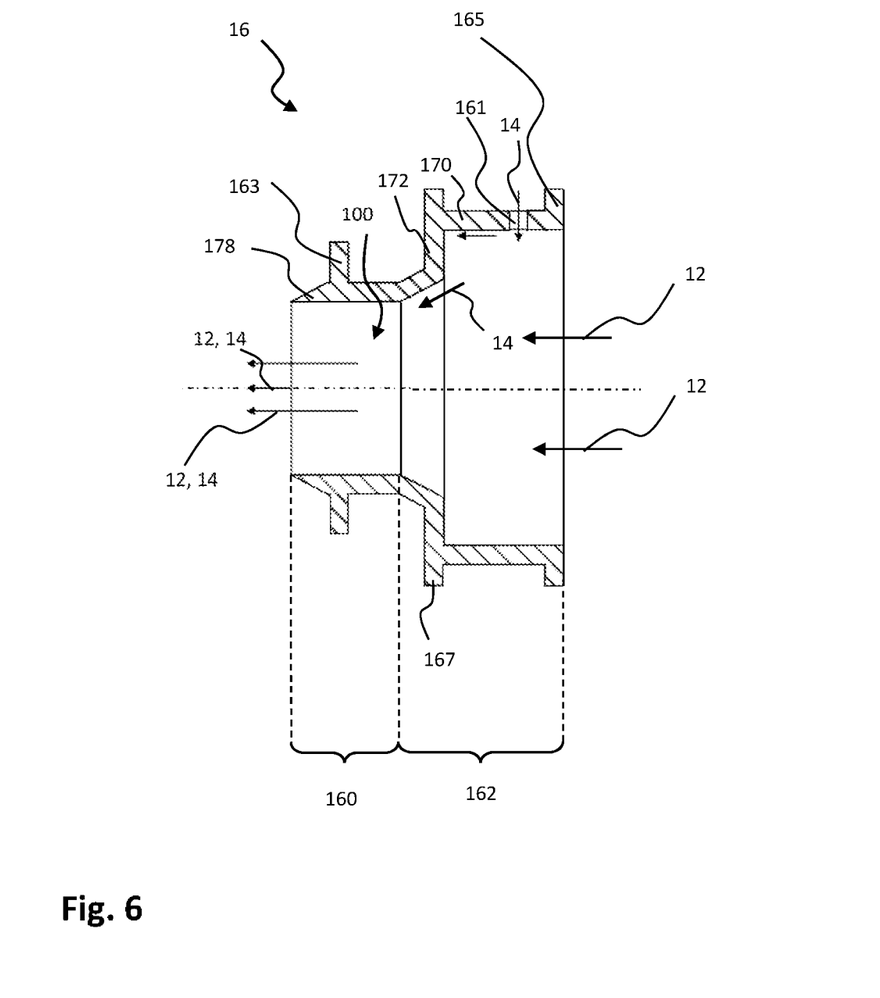
FIG. 6 schematically shows a duct segment for being used in a gas mixer according to a further embodiment.

The embodiment of the individual duct segment 16 is also explained in the illustration and explanations provided in the context of FIG. 6.

To this end, the gas mixer 10 shown in FIG. 2 may comprise a first duct segment 16, a second duct segment 18 and a further duct segment 20. The first duct segment 16 may comprise a first tube section 160 and a first cone section 162, the second duct segment 18 may comprise a second tube section 180 and a second cone section 182 and the further duct segment 20 may comprise a further tube section 200 and a further cone section 202. The first duct segment 16, the second duct segment 18 and the further duct segment 20 may be axially stackable such that in a stacked state, a main gas conduit 100 may be formed by the first tube section 160, the second tube section 180 and the further tube section 200. The gas mixer 10 may further comprise an admix gas conduit 102 which may be formed between the first cone section 162 and the second duct segment 18 as well as a further admix gas conduit 104 which may be formed between the second cone section 182 and the further tube section 200.

To this end, where applicable, the same principles discussed in the context of FIG. 1 may also apply to FIG. 2. In particular, the further duct segment may also be a casting.

More specifically, the first admix gas conduit 102 may be formed between the first cone section 162 and the second tube section 180. In particular, the second tube section 180 may be tapered and in the shape of a nozzle such that the first admix gas conduit 102 leads into the main gas conduit 100 at an angle of 10-45°, preferably 30°.

According to the example shown in FIG. 2, the first admix gas conduit 102 may be formed between a first end of the first cone section 162 and a second end of the second tube section 180. In particular, the second end of the second tube section 180 may be tapered and in the shape of a nozzle such that the first admix gas conduit 102 leads into the main gas conduit 100 at an angle of 10-45°, preferably 30°.

Likewise, the second admix gas conduit 104 may be formed between the second cone section 182 and the further tube section 200. In particular, the further tube section 200 may comprise a tapered end in the shape of a nozzle such that the second admix gas conduit 104 may lead into the main gas conduit 100 at an angle of 10-45°, preferably 30°.

According to the example shown in FIG. 2, admix gas conduit 104 may be formed between a first end of the second cone section 182 and a second end of the further tube section 200. In particular, the second end of the further tube section 200 may comprise a tapered end in the shape of a nozzle such that the second admix gas conduit 104 may lead into the main gas conduit 100 at an angle of 10-45°, preferably 30°.

The main gas conduit 100 may be configured to convey air 12. The admix gas conduits 102 and 104 may be configured to convey the admix gases 14 and 22 to be admixed to the air 12, respectively. In a stacked state, the admix gas conduits 102, 104 may each be fluidly connected to the main gas conduit 100 by an annular gap 24.

As shown in FIG. 2, each of the admix gas conduits 102 and 104 may comprise, in a stacked state, a stepped portion forming a gas chamber 101 and a fin 103 forming a constriction downstream of the gas chamber 101. Further, each of the first duct segment 16 and the second duct segment 18 may comprise a gas inlet port 161 and 181, in order to provide an admix gas 14 and 22 supplied to respective admix gas conduit 102 and 104. Along each admix gas conduit 102 and 104, the corresponding admix gas 14, 22 may accumulate, or swirl, within the gas chamber 101 and may subsequently accelerate during their passage of the constriction formed by the fin 103. Thereby, the mass flow through the admix gas conduit 102 and 104 may be restricted following design principles known from labyrinth seals. To this end, the gas mixer 10 may also comprise a multitude of fins provided at a predetermined distance from each other such that a labyrinth seal is formed.

Each one of the first duct segment 16, the second duct segment 18 and a further duct segment 20 may comprise a tube section flange 163 and a cone section flange 165. For the sake of brevity, in FIG. 2 and in the subsequent specification, the tube section flange 163 and cone section flange 165 are only referenced for the first duct segment 16. However, according to the embodiment shown in FIG. 2, every one of the duct segments 16, 18 and 20 may comprise said tube section flange 163 and cone section flange 165.

The tube section flanges of the second duct segment 18 and the further duct segment 20 each may act as a fin 103 in the respective admix gas conduit 102 and 104. Each of the duct segments 16, 18 and 20 may comprise a mid-section flange 167 which may be configured such that it is connectable with a cone section flange 165 of another duct segment 16, 18, 20. In the shown embodiment, the mid-section flange 167 of the second duct segment 18 may be connected with the cone section flange 165 of the first duct segment 16. Likewise, the mid-section flange 167 of the further duct segment 20 may be connected with the cone section flange 165 of the second duct segment 18.

According to the shown embodiment, the first duct segment 16 and the second duct segment 18 may be substantially identical. In particular, all of the first, second and further duct segments 16, 18 and 20 may substantially be identical. Preferably, the first, second and further duct segments 16, 18 and 20 may each be a casting. According to the embodiment shown in FIG. 2, the further duct segment 20 may differ from the first duct segment 16 and the second duct segment 18 in that the further duct segment 20 may not comprise a gas inlet port. Additionally or alternatively, the further duct segment 20 may also comprise a gas inlet port for a further gas to be admixed to the main gas conduit 100. Likewise, each of the first, second and further duct segments 16, 18 and 20 may also have several admix gas inlet ports for the same or different admix gases. Each of the admix gas conduit 102 and 104 may be suitable for conveying a gas comprising a natural gas, a biogas, hydrogen, crankcase ventilation gas, exhaust gas recirculation gas, a compressor bypass gas and/or a crankcase ventilation system.

Further, the admix gas may be selected from the group consisting of Methane, Ethane, Ethylene, Acetylene, Propane, Propylene, Propyne, and n-Butane without being limited thereto.

In principle, the disclosure is directed to a gas mixer having a modular design. For each gas to be admixed with the combustion air, a separate annular chamber may be created. Said chamber may be connected to the inner volumina of the gas mixer 10 via the annular gap 24. To create this kind of geometry, similar rotational symmetric parts may simply be stacked together. For each additional gas to be admixed with the combustion air 12 only one additional part may have to be added longitudinally/axially. The annular chamber, the admix gas conduit, results from the interaction of two stacked (interlocked) parts.

To improve the mixing behavior of the gas mixer 10, an additional fin 103 may be added to separate the annular chamber into two annular chambers. These separate chambers are connected via an annular gap in the form of the constriction with each other. This could improve the non-symmetrical in-flow of gas into the annular chamber, the admix gas conduit 102, and therefore improve the mixing of the gas with the combustion air 12. The complexity of this solution is very low. For every gas that should be admixed with combustion air 12 only one additional similar duct segment is necessary. In other words: combustion air+1 gas=1 parts, combustion air+2 gases=3 parts, combustion air+n gases=n+1 parts.

Figure 3:
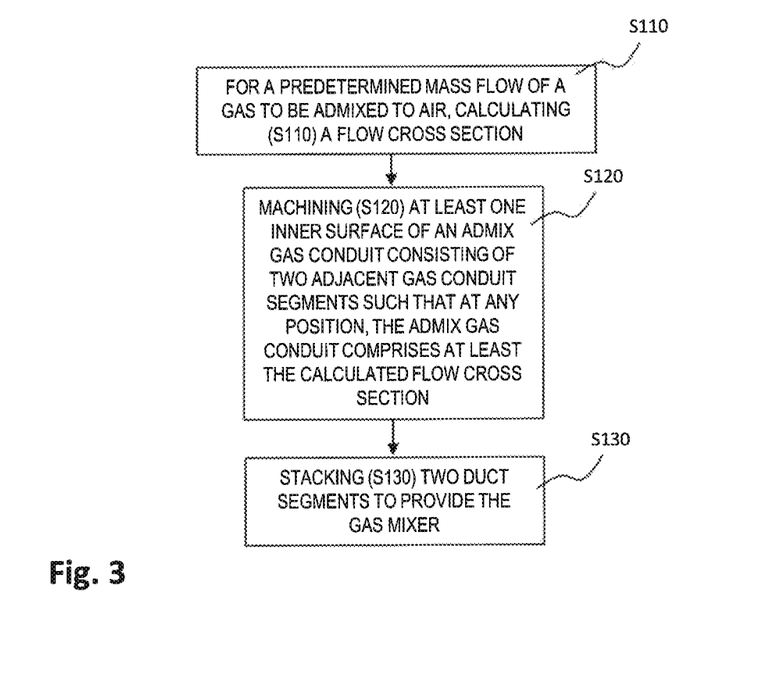
FIG. 3 schematically shows a flow diagram depicting a method, according to an embodiment.

Referring to FIG. 3, a schematic flow diagram of a method for producing a gas mixer according to an embodiment is shown. In a calculating step S110, for a predetermined mass flow of a gas to be admixed to air, a flow cross section may be calculated. In a machining step S120, at least one inner surface of an admix gas conduit 102 and 104 may be machined, such that at any position, the admix gas conduit 102 and 104 comprises at least the calculated flow cross section. Depending on which of the two duct segments 16, 18 forming the admix gas conduit 102 is referred to, the inner surface of the admix gas conduit 102 may be an outer surface or an inner surface of a duct segment 16, 18. In a stacking step S130, two duct segments 16 and 18 may be stacked to provide the gas mixer 10.

Figure 4:
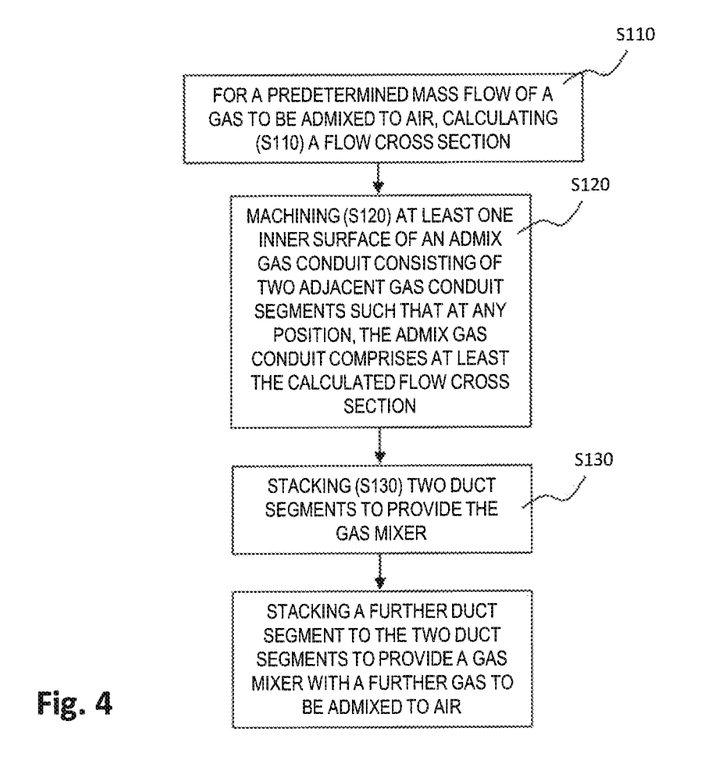
FIG. 4 schematically shows a flow diagram depicting a method according to a further embodiment.

Referring to FIG. 4, a schematic flow diagram is shown, illustrating a further embodiment of a method for producing a gas mixer 10 according to the present disclosure. The method disclosed in FIG. 4 may comprise the steps of the embodiment shown in FIG. 3 and an additional step of stacking S130 a further duct segment 20 to the two duct segments 16 and 18 to provide a gas mixer 10 with a further gas to be admixed to air.

The methods disclosed in FIGS. 3-4 may be combined. As an example, within the methods disclosed in FIG. 3 and four, the step of machining S120 may comprise rolling, curving, cutting, grinding, turning, milling, drilling and surface finishing.

The methods disclosed in FIGS. 3 and 4, the step of stacking S130 may further comprise placing a spacer in between two adjacent duct segments 16, 18, 20. Further, the step of stacking S130 may further comprise fastening two stacked duct segments at their flanges by means of screws or by welding two stacked duct segments to one another.

The methods disclosed in FIGS. 3 and 4 may further comprise the step of manufacturing a cast raw part, preferably the same cast raw part for each of the first, second and, optionally, further duct segment.

Figure 5:
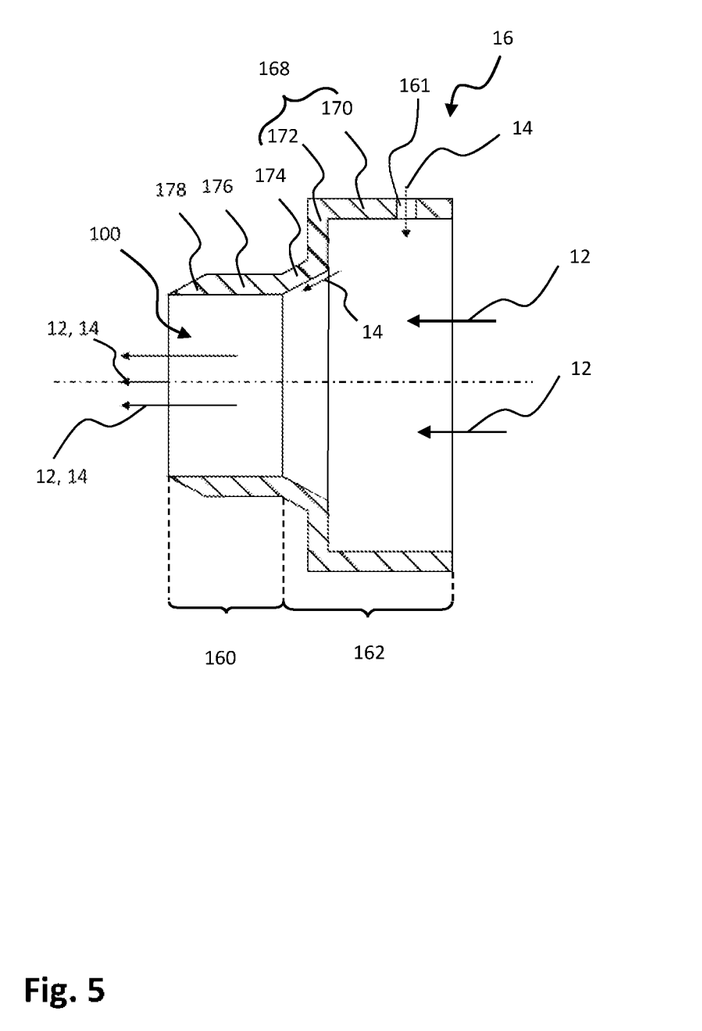
FIG. 5 schematically shows a duct segment for being used in a gas mixer according to an embodiment.

FIG. 5 schematically illustrates a duct segment 16 for being used in a gas mixer. The duct segment 16 shown in FIG. 5 is identical to the duct segment 16 shown in FIG. 1 in the context of the gas mixer. To this end, where applicable, the same principles discussed in the context of FIG. 1 may also apply to FIG. 5. Vice versa, where applicable, the same principles discussed in the context of FIG. 5 may also apply to FIG. 1. In particular, the duct segment 16 may be a casting.

The duct segment 16 may comprise a tube section 160 and a cone section 162. In the tube section 160, a main gas conduit 100 may be formed.

According to the nomenclature used in the present disclosure, the overall shape of the duct segment 16 may consist of two sections, the tube section 160 and the cone section 162. To this end, as seen from the direction of the gas 12 flowing through the duct segment 16, a large diameter tube portion 170 may lead into a perpendicular wall portion 172 protruding radially inwardly. The wall portion 172 may then lead into the cone portion 174 protruding radially inwardly and thus constricting the cross-section of the duct segment further. The cone portion 174 may then lead into the concentric small diameter tube portion 176. At the end of the small diameter tube portion 176, the nozzle 178 is provided. The gas inlet port 161 may be provided on the large diameter tube portion. The nozzle 178 may have an inclination angle from 10°-45°, for example 30°. The gas inlet port 161 may be a through hole.

According to the present disclosure, the combination of the large diameter tube portion 170 and the perpendicular wall portion 172 may be referred to as stepped portion 186.

To this end, the tube section 160 may comprise the small diameter tube portion 176 and the nozzle 178. Further, the cone section 162 may comprise the large diameter tube portion 170, the perpendicular wall 172 and the cone portion 174.

The main gas conduit 100 may be configured such as to convey air 12. Further, the duct segment 16 may comprise a gas inlet port 161 to provide an admix gas 14 supply to be admixed with the gas 12 in the main gas conduit 100.

FIG. 6 schematically illustrates a duct segment 16 for being used in an admix gas mixer according to another embodiment. The duct segment 16 shown in FIG. 6 may be identical to the duct segment 16 shown in FIG. 2. Where applicable, the same principles discussed in the context of FIG. 2 may also apply to FIG. 6. Vice versa, where applicable, the same principles discussed in the context of FIG. 6 may also apply to FIG. 2. In particular, the duct segment 16 may be a casting.

The embodiment of the duct segment 16 may basically consist of a modified duct segment 16 shown in FIG. 5. To this end, where applicable, the same principles discussed in the context of FIG. 5 may also apply to FIG. 6.

In FIG. 6, the duct segment 16 may comprise a tube section 160 and a cone section 162. In the tube section 160, a main gas conduit 100 may be formed. The end of the tube section 160 may be tapered in the shape of a nozzle. The nozzle may have an inclination angle from 10°-45°, for example 30°.

The main gas conduit 100 may be configured such as to convey air. Further, the duct segment 16 may comprise a gas inlet port 161 to provide an admix gas 14 supply to be admixed with the gas 12 in the main gas conduit 100.

The duct segment 16 may comprise a tube section flange 163 and a cone section flange 165. The tube section flange 163 may protrude radially outwardly from the tube portion 160 where the nozzle 178 ends. The cone section flange 165 may protrude radially outwardly from the cone section 162 at the longitudinally outermost position of the large diameter tube portion 170.

The duct segment 16 may further comprise a mid-section flange 167. The mid-section flange may be provided in the cone section 162. More specifically, the mid-section flange 167 may be provided as an extension of the perpendicular wall portion 174. The mid-section flange 167 and the cone section flange 165 may have the same outer diameter.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, there may be more than a first, a second and a further duct segment present in the gas mixer without departing from the disclosed teaching. Likewise, there may be more than a first and second gas to be admixed to air for each duct segment or for the gas mixer as a whole.

A gas mixer for an internal combustion engine for mixing air with at least one admix gas, comprising a first duct segment having a first tube section and a first cone section, and a second duct segment having a second tube section and a second cone section may be provided. The first and second duct segment may be stackable such that in a stacked state, a main gas conduit is formed by the first and second tube sections and an admix gas conduit is formed between the first cone section and the second duct segment.

In other words, the admix gas conduit may be formed by two boundary surfaces, wherein each boundary surface is provided by a structure of an individual duct segment.

Thereby, the gas mixer provides a simple, cost-effective and reliable gas mixer which is usually installed upstream of a turbocharger of internal combustion engine such as a gas engine. In particular, the gas mixer may be equipped with several duct segments which may have a modular design. The gas mixer consisting of several duct segments may be installed in a tubing upstream of a turbocharger such that air and all admixed gases are readily mixed before the gas mixture enters the turbocharger.

Due to an increased simplicity of the system, component costs as well as installation costs may be decreased.

In a further development, the admix gas conduit may be formed between the first cone section and the second tube section, preferably wherein the second tube section may comprise a tapered and in the shape of a nozzle, preferably such that the admix gas conduit may lead into the main gas conduit at an angle of 30°. According to this development, the admix gas conduit may be provided by an inner surface of the first cone section and an adjacent outer surface of the second tube section. The inner surface of the first cone section may belong to the first duct segment. The outer surface of the second tube section may belong to the second duct segment, in particular the end of the second tube section of the second duct segment. By providing a tapered end in the shape of a nozzle, the admix gas conduit may comprise a constant cross-section. As an example, in the first cone section comprises a cone angle of 30° and the nozzle comprises a nozzle angle of 10-45°, preferably 30°, the admix gas conduit may lead into the main gas conduit at an angle of 10-45°, preferably 30°. Thereby, and efficient at mixing of gas to be admixed to the gas flowing in the main gas conduit may be achieved.

In a further embodiment, the main gas conduit may be configured to convey air and the admix gas conduit may be configured to convey a gas to be admixed to the air, wherein in a stacked state, the admix gas conduit may be fluidly connected to the main gas conduit by an annular gap. By fluidly connecting the main gas conduit with the admix gas conduit via the annular gap allows an efficient and thus frictionless admixing of air and gas to be admixed.

In a further embodiment, the gas mixer may further comprise a further duct segment having a further tube section and a further cone section, wherein the further duct segment may be stackable with the any one of the first and second duct segments such that in a stacked state, the main gas conduit is formed by the first, second and further tube section and a further admix gas conduit may be formed between the second cone section and the further tube section.

In other words, this configuration consists of the first embodiment of the present disclosure with the addition of a further duct segment which is additionally stacked onto the first embodiment. Thereby, a further gas to be admixed to the air may easily be implemented by simply installing a further duct segment onto the first embodiment consisting of a first and second duct segment. Theoretically, any number of duct segments being stacked onto each other may be realized.

To this end and according to the present disclosure, each duct segment added forms a new admix gas conduit, allowing to admix a further gas to the main gas conduit. Likewise, each duct segment added also extends the main gas conduit due to the added tube section of the corresponding duct segment. Thereby, a modular approach having a great flexibility may be achieved. Also, gases to be admixed may easily be distinguished from each other due to their uniquely associated duct segment. Thereby, the likelihood of installation errors may be reduced and maintenance routines may be simplified.

According to a further development, the admix gas conduit, in a stacked state may comprise a stepped portion forming a gas chamber and preferably a fin forming a constriction downstream of the gas chamber. Thereby, fluctuations in gas flow within the admix gas conduit may be flattened. Rest the gas chamber may provide a buffer zone for externally injected gas to be admixed, the constriction formed at the fin constricts the gases mass flow by the gap that is provided between the fin and the adjacent cone section of the adjacent duct segment.

According to a further embodiment, one, some, or all of the duct segments may comprise a gas inlet port. Thereby, a dedicated admix gas may be injected externally at a predetermined mass flow into the admix gas conduit. According to a further embodiment, a duct segment may comprise a tube section of flange and a cone section flange. Preferably, every duct segment may comprise a tube section flange and a cone section flange. The tube section flange has the advantage of being able to couple the duct segment to an external tube or, if the duct segment is stacked into another duct segment, the tube section flange may incorporate the function of a fin.

According to a further embodiment, the duct segments may comprise a mid—section flange which may be configured such that it is connectable with a cone section flange of another duct segment. Thereby, stacking two duct segments may be achieved by coupling or connecting a cone section flange of a first duct segment with a midsection flange of a second duct segment. Further, the cone section flange of the second duct segment may be configured such that it is able to be coupled to an external tube. Thereby, the duct segments may be easily stacked onto each other.

According to a further development, the duct segments may be substantially identical. Thereby, complexity and production costs may be reduced and reliability as well as cost efficiency of the gas mixer may be enhanced while increasing safety due to the simple design.

According to a further development, the gas mixer may comprise at least one admix conduit suitable for conveying a gas comprising natural gas, biogas, hydrogen, crankcase ventilation gas, exhaust gas recirculation gas or a compressor bypass gas. To this end, gases typically utilized in internal combustion engines having a gases fuel may be admixed to air or another feed gas used to fuel the internal combustion engine.

A method may be provided for producing a gas mixer comprising the steps of: for a predetermined mass flow of a gas to be admixed to air, calculating a flow cross-section, machining at least one inner surface of an admix gas conduit such that at any position, the admix gas conduit comprises at least the calculated flow cross-section and stacking the two duct segments to provide the gas mixer.

By calculating a flow cross section, the predetermined mass flow of the gas to be admixed to air may be converted into geometric dimensional requirements needed in the admix gas conduit. By machining the at least one inner surface of an admix gas conduit, it is possible to adjust duct segments as identical cast raw parts until the admix gas conduit fulfills the geometric dimensional requirements, hence meet the calculated flow cross section. In other words, machining the at least one inner surface of an admix gas conduit may be the only difference between a first duct segment and a second duct segment. Naturally, more or all of the inner surface of an admix gas conduit may be machined. Likewise, at least one, more or all of the inner surfaces of an admix gas conduit may also be processed such, that the flow cross section is reduced. In other words, the term machining not only relates to ablative and applying material processes.

According to a further embodiment, the step of machining may further comprises rolling, curving, cutting, grinding, turning, milling, drilling and surface finishing.

According to a further embodiment, the method may include a step of manufacturing duct segment from a cast raw part, preferably wherein the cast raw part comprises metal, preferably a cast iron from the group of iron-carbon alloys with a carbon content more than 2%.

According to a further development, the step of stacking may comprise stacking a further duct segment to the two duct segments to provide a gas mixer with a further gas to be admixed to air. In other words, this configuration consists of the first embodiment of the present disclosure with the addition of a further duct segment which is additionally stacked onto the first embodiment. Thereby, a further gas to be admixed to the air may easily be implemented by simply installing a further duct segment onto the first embodiment consisting of a first and second duct segment. Theoretically, any number of duct segments being stacked onto each other may be realized.

In a further development, the step of stacking may further comprise placing a spacer in between two adjacent duct segments. Preferably, the spacer may be placed between a cone section flange of a first duct segment and a midsection flange of a second duct segment stacked into the first duct segment. Providing the spacer in between the two adjacent duct segments may have the advantage of changing the gas chamber and/or the constriction within the admix gas conduit between the first duct segment and the second duct segment.

According to a further embodiment, the step of stacking may further comprise fastening two stacked duct segments at their flanges by means of screws or by welding two stacked duct segments to one another. Preferably, fastening the two stacked duct segments may be done via connecting a cone section flange of a first duct segment with a mid-section flange of a second duct segment stacked into the first duct segment. Thereby, assembling the gas mixer in a gas leak tight manner can be achieved.

A duct segment for being used in a gas mixer for an internal combustion engine for mixing air with at least one admix gas may be provided. The duct segment may comprise a tube section and a cone section. Thereby, the duct segment may be stackable with another duct segment to achieve a gas mixer of increased simplicity and reduced component costs.

According to a further embodiment, the tube section may comprise a small diameter tube portion having a nozzle on its open end, preferably wherein the nozzle may have an inclination angle from 10°-45°, in particular 30°. Thereby, stacking the duct segment may be simplified. Further, in a stacked condition, a gas flow along the inner surfaces of the cone section may be guided into the main gas conduit at a minimum pressure loss.

According to a further embodiment, the cone section may comprise a large diameter tube portion, a perpendicular wall portion and a cone portion, wherein the large diameter tube portion and the perpendicular wall portion may form a stepped portion. Thereby, in a stacked condition, a gas chamber may be formed along the inner surfaces of the cone section.

According to a further embodiment, the duct segment may be a casting. Thereby, a simple, cost-effective and durable duct segment slug may be provided. Further, the surfaces of the castings may be machined easily.

According to a further embodiment, at least one of the inner and/or outer surfaces of the duct segment may comprise a machined surface. Thereby the flow cross-sections of the gas flowing through or along the duct segment may by adjusted. In particular, the surfaces forming an admix gas conduit in a stacked condition may be subjected to surface machining. Such surfaces may for example be the outer side of the nozzle, the outer side of the small diameter tube portion, the outer diameter of the cone portion, the outer diameter of the perpendicular wall portion and the outer diameter of the large diameter tube portion.

According to a further embodiment, the duct segment may comprise a tube section flange, a cone section flange and/or a mid-section flange. Thereby, the duct segment may be stacked conveniently. Further, the mid-section flange may serve as flow restriction if the duct segment is stacked into another duct segment. Thereby, the gas flow through an admix gas conduit formed in between the two duct segments may be delimited to a predetermined amount.

Accordingly, technical features which are described in connection with the above method may also relate and apply to the proposed gas mixer and vice versa.

INDUSTRIAL APPLICABILITY

With reference to the figures, a gas mixer for an internal combustion engine for mixing air with at least one further gas and a method for producing a gas mixer as mentioned above is applicable in any suitable combustion engine in particular in turbo charged engines and internal combustion engines (ICEs) for gases fuels.

In practice, an engine, a gas mixer used by the engine a fuel gas feed component, a fuel gas feed system and/or any combination of these various assemblies and components may be manufactured, bought, or sold to retrofit an engine, or an engine already in the field in an aftermarket context, or alternatively may be manufactured, bought, sold or otherwise obtained in an OEM (original equipment manufacturer) context.

As alluded to previously herein, the aforementioned embodiments may increase the life of the fuel gas feed component and/or gas mixer while maintaining or even improve and engine operations safety as will be elaborated further herein momentarily.

Referring to FIG. 1, there is an embodiment shown disclosing two duct segments which are stackable thus forming a main gas conduit and an admix gas conduit. By that, not only two duct segments may be provided but in addition thereto, a multitude of duct segments may be stacked into each other, whereas two adjacent duct segments provide a dedicated admix gas conduit in between them. So, one skilled in the art will expected various embodiments of the present disclosure will have an improved simplicity, necessitating less maintenance and less complex gas mixers.

The same advantages apply to the methods disclosed in FIGS. 2-4.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

Certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A gas mixer for an internal combustion engine for mixing air with at least one admix gas, comprising a first duct segment having a first tube section and a first cone section, and a second duct segment having a second tube section and a second cone section,
characterized in that
the first and second duct segments are stacked onto each other such that, a main gas conduit is formed by the first and second tube sections and an admix gas conduit is formed between the first cone section and the second duct segment, wherein the admix gas conduit, in a stacked state, comprises a stepped portion forming a gas chamber and a fin forming a constriction downstream of the gas chamber.

2. The gas mixer according to claim 1, wherein the admix gas conduit is formed between the first cone section and the second tube section, preferably wherein the second tube section comprises a tapered end in the shape of a nozzle, preferably such that the admix gas conduit leads into the main gas conduit at an angle of 10-45°.

3. The gas mixer according to claim 1, wherein the main gas conduit is configured to convey air and the admix gas conduit is configured to convey a gas to be admixed to the air, wherein in a stacked state, the admix gas conduit is fluidly connected to the main gas conduit by an annular gap.

4. The gas mixer according to claim 1, wherein the gas mixer further comprises a further duct segment having a further tube section and a further cone section, wherein the further duct segment is stackable with the any one of the first and second duct segments such that in a stacked state, the main gas conduit is formed by the first second and further tube sections and a further admix gas conduit is formed between the second cone section and the further tube section.

5. The gas mixer according to claim 1, wherein one, some or all of the duct segments comprise a gas inlet port.

6. The gas mixer according to claim 1, wherein a duct segment comprises a tube section flange and a cone section flange.

7. The gas mixer according claim 6, wherein the duct segment comprises a mid-section flange which is configured such that it is connectable with a cone section flange of another duct segment.

8. The gas mixer according to claim 1, wherein the duct segments are substantially identical.

9. The gas mixer according to claim 1, wherein the gas mixer comprises at least one admix gas conduit suitable for conveying a gas comprising natural gas, biogas, hydrogen, crankcase ventilation gas, exhaust gas recirculation gas or a compressor bypass gas.

10. A method for producing a gas mixer according to claim 1, comprising the steps of:
for a predetermined mass flow of a gas to be admixed to air, calculating a flow cross section;
machining at least one inner surface of an admix gas conduit such that at any position, the admix gas conduit comprises at least the calculated flow cross section;
stacking two duct segments to provide the gas mixer.

11. The method according to claim 10, wherein the step of machining comprises rolling, curving, cutting, grinding, turning, milling, drilling and surface finishing.

12. The method according to claim 10, wherein the step of stacking comprises stacking a further duct segment to the two duct segments to provide a gas mixer with a further gas to be admixed to air.

13. The method according to claim 10, wherein the step of stacking further comprises placing a spacer in between two adjacent duct segments.

14. The method according to claim 10, wherein the step of stacking further comprises fastening two stacked duct segments at their flanges by means of screws or by welding two stacked duct segments to one another.

15. A duct segment for being used in a gas mixer for an internal combustion engine for mixing air with at least one admix gas, comprising a tube section and a cone section.

* * * * *